United States Patent
Lindholm et al.

(10) Patent No.: US 8,159,496 B1
(45) Date of Patent: *Apr. 17, 2012

(54) SUBDIVIDING A SHADER PROGRAM

(75) Inventors: John Erik Lindholm, Saratoga, CA (US); Brett W. Coon, San Jose, CA (US); Gary M Tarolli, Concord, MA (US)

(73) Assignee: NVIDIA Corporation, Santa Clara, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 12/476,137

(22) Filed: Jun. 1, 2009

Related U.S. Application Data

(63) Continuation of application No. 11/136,346, filed on May 23, 2005, now Pat. No. 7,542,043.

(51) Int. Cl.
- *G06T 1/20* (2006.01)
- *G06T 1/00* (2006.01)
- *G06F 15/80* (2006.01)
- *G09G 5/00* (2006.01)

(52) U.S. Cl. ........ 345/506; 345/501; 345/505; 345/552; 345/557; 345/582

(58) Field of Classification Search ...................... None
See application file for complete search history.

(56) References Cited

U.S. PATENT DOCUMENTS

| | | | | |
|---|---|---|---|---|
| 6,138,230 | A * | 10/2000 | Hervin et al. | 712/216 |
| 6,326,964 | B1 * | 12/2001 | Snyder et al. | 345/419 |
| 2004/0012596 | A1 * | 1/2004 | Allen et al. | 345/501 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner* — Xiao M. Wu
*Assistant Examiner* — Tize Ma
(74) *Attorney, Agent, or Firm* — Patterson & Sheridan, LLP

(57) ABSTRACT

Methods and apparatus for subdividing a shader program into regions or "phases" of instructions identifiable by phase identifiers (IDs) inserted into the shader program are provided. The phase IDs may be used to constrain execution of the shader program to prohibit texture fetches in later phases from being executed before a texture fetch in a current phase has completed. Other operations (e.g., math operations) within the current phase, however, may be allowed to execute while waiting for the current phase texture fetch to complete.

16 Claims, 6 Drawing Sheets

SUBDIVIDING A SHADER PROGRAM

CROSS-REFERENCE TO RELATED APPLICATIONS

This application is a continuation of U.S. patent application Ser. No. 11/136,346 titled, "SUBDIVIDING A SHADER PROGRAM," filed May 23, 2005 now U.S. Pat. No. 7,542,043. The subject matter of this related application is hereby incorporated herein by reference.

BACKGROUND OF THE INVENTION

1. Field of the Invention

This invention relates generally to executing programs that access a cache memory and more specifically to a system and method for subdividing such programs to efficiently utilize the cache memory.

2. Description of the Related Art

A typical computer system includes a general purpose central processing unit (CPU) that executes application program instructions and generates output data that is to be displayed on a monitor. When performing computer graphics functions, the output data generated by the CPU typically consists of a high level description of a scene to be displayed, and other high level information such as from where the scene is to be viewed, and various details aimed at adding realism to the scene, such as textures to be applied to different elements in the scene.

In order to prepare this relatively complex scene, the output data from the CPU is typically processed by a graphics processing unit (GPU). Modern GPUs commonly include a processing unit, referred to as a shader unit that is generally responsible for defining the final surface properties of objects visible in the displayed scene. For example, the shader unit can define the color, reflectivity, and transluscency of object surfaces. To provide developers with flexibility to create sophisticated (e.g., highly realistic) graphics, shader units are often programmable. In other words, the shader units are capable of executing shader programs that consist of a number of program instructions that specify exactly how the final object surfaces are generated.

FIG. 1 illustrates an exemplary GPU shader unit 100 configured to execute multiple threads 110 of shader program instructions. The shader unit 100 may be programmed to operate on surface, primitive, vertex, fragment, pixel, sample or any other data. For simplicity, the term "samples" is hereinafter used to refer to any such surfaces, primitives, vertices, pixels, fragments or the like, operated on by the shader unit 100. The shader unit 100 may perform the instruction threads 110 on multiple samples in a pipelined manner, with different instructions performed on the samples as they travel down the pipeline. As illustrated, the instructions are generally classified as math operations 112 and texture fetch operations 114. The math operations 112 typically include various instructions to blend one or more texture values, fetched with the texture fetch operations 114, from texture memory to generate an output sample color.

One obstacle faced by developers is the general requirement of extremely high bandwidth to memory utilized by the shader program, as there are commonly millions of accesses to memory per second. In order to provide this bandwidth and improve performance when executing the shader program instructions, the GPU often utilizes a relatively small high speed local texture cache 120. As with all cache systems, locality is a major performance issue in texture cache systems. If a desired piece of texture data is not in the texture cache 120, latency penalties are incurred to transfer the texture data from (main) memory.

According to some shader architectures, execution of instructions in a shader program may be relatively constrained in an effort to make efficient use of the texture cache 120. For example, according to some architectures, several samples may be gathered and common instructions executed for all the samples. In this case, texture data fetched from the same texture ID may be used in instructions on several of samples. As an example, because the samples may have come from a tile (e.g., an 8×8 tile of samples), instructions may be executed on one sample, and then adjacent samples, in a very simple order. While a current texture fetch 114 is in process, subsequent instructions may be prohibited from executing, thereby preventing different texture fetches 114 from fighting for the texture cache.

Due to this constraint, this architecture may experience a very ordered pattern of memory fetches to place required texture data in the texture cache 120, resulting in generally efficient use of the texture cache 120 (i.e., with relatively few cache misses). Unfortunately, because each instruction is typically performed monolithically in such a constrained architecture, overall performance of the system may suffer. For example, in some cases, some math instructions may be prohibited from executing while waiting for completion of a texture fetch even though these math instructions may not be dependent on the fetched texture.

Some architectures may remove these constraints and allow instructions of a shader program to be performed on samples in a somewhat random order, as they are presented. As an example, a first sample may be at a later point in the shader program, while a second sample is at an earlier point (e.g., because the samples may be processed in scan line order), which may result in some advantages. For example, while operations on one sample are stalled while waiting on a dependent texture fetch, operations for another sample that are not dependent may be able to proceed. Unfortunately, texture fetches may occur somewhat randomly when executing instructions in this unconstrained manner, leading to an increased number of cache misses. In other words, gains in processing efficiency by reducing stalls in execution may be offset by increased latencies as texture data is continuously flushed from the texture cache 120 and re-fetched as multiple threads of instructions fight for cache space. While increasing the cache size may reduce this fighting, that approach is typically not desirable, as it would consume precious silicon real estate on the GPU.

Accordingly, what is needed is a technique for limited constraint when executing a shader program, preferably that allows efficient cache usage while reducing the performance impact of execution stalls.

SUMMARY OF THE INVENTION

Embodiments of the present invention provide technique and apparatus for constraining the execution of program that access a cache.

One embodiment provides a method of executing a shader program subdivided into phases of executable instructions for processing samples, each phase having one or more math operations and one or more texture cache access operations. The method generally includes (a) executing math and texture cache access operations in a current phase of the shader program until a boundary between the current phase and a subsequent phase is reached, (b) after the phase boundary has been reached, continuing execution of math and texture cache access operations in the current phase while preventing the execution of texture cache access operations in the subsequent phase until all texture cache access operations in the current phase have completed, and (c) allowing the execution of texture operations in the subsequent phase after all texture cache access operations in the current phase have completed.

Another embodiment provides a graphics processing unit generally including a texture cache, a shader unit, and execution control logic. The shader unit is capable of executing a shader program subdivided into phases, each phase having one or more math operations and one or more texture cache access operations to fetch texture data from the texture cache to process samples. The execution control logic configured to constrain the execution of texture cache access operations in one or more threads of a shader program running in the shader unit based on which phases of the shader program are executing on the one or more threads.

Another embodiment provides an integrated circuit (IC) device generally including an execution unit for executing a program subdivided into phases, each phase having one or more non-cache related operations and one or more cache access operations and execution control logic. The execution control logic is generally configured to constrain execution of cache access operations of a program running in the execution unit based on one or more active phases of the program.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for subdividing a shader program into regions or "phases" of instructions identifiable by phase identifiers (IDs) inserted into the shader program. The phase IDs may be used to constrain execution of the shader program to prohibit texture fetches in later phases from being executed before a texture fetch in a current phase has completed. Other operations (e.g., math operations) within the current phase, however, may be allowed to execute while waiting for the current phase texture fetch to complete.

As a result, embodiments of the present invention may represent a compromise between shader architectures that totally constrain execution to prohibit any instruction from executing while waiting for a texture fetch to complete and architectures that have no constraints on execution at all. In effect, the phase IDs are used to increase locality in the texture cache within an identified phase of execution and serve to reduce fighting for texture space between executing threads.

As used herein, the term thread generally refers to an independent stream of executable instructions. In shader units, multiple threads may be running, for example, with each thread performing operations on a group of one more samples. To facilitate understanding, embodiments of the present invention will be described below with reference to a shader unit integrated within a graphics processing unit (GPU) as a particular, but not limiting, application example. However, those skilled in the art will recognize that the concepts described herein may be used to advantage in a wide variety of other applications where constrained execution of program instructions may lead to efficient utilization of a cache while reducing the performance impact of execution stalls.

An Exemplary Subdivided Shader Program

Figure 1:
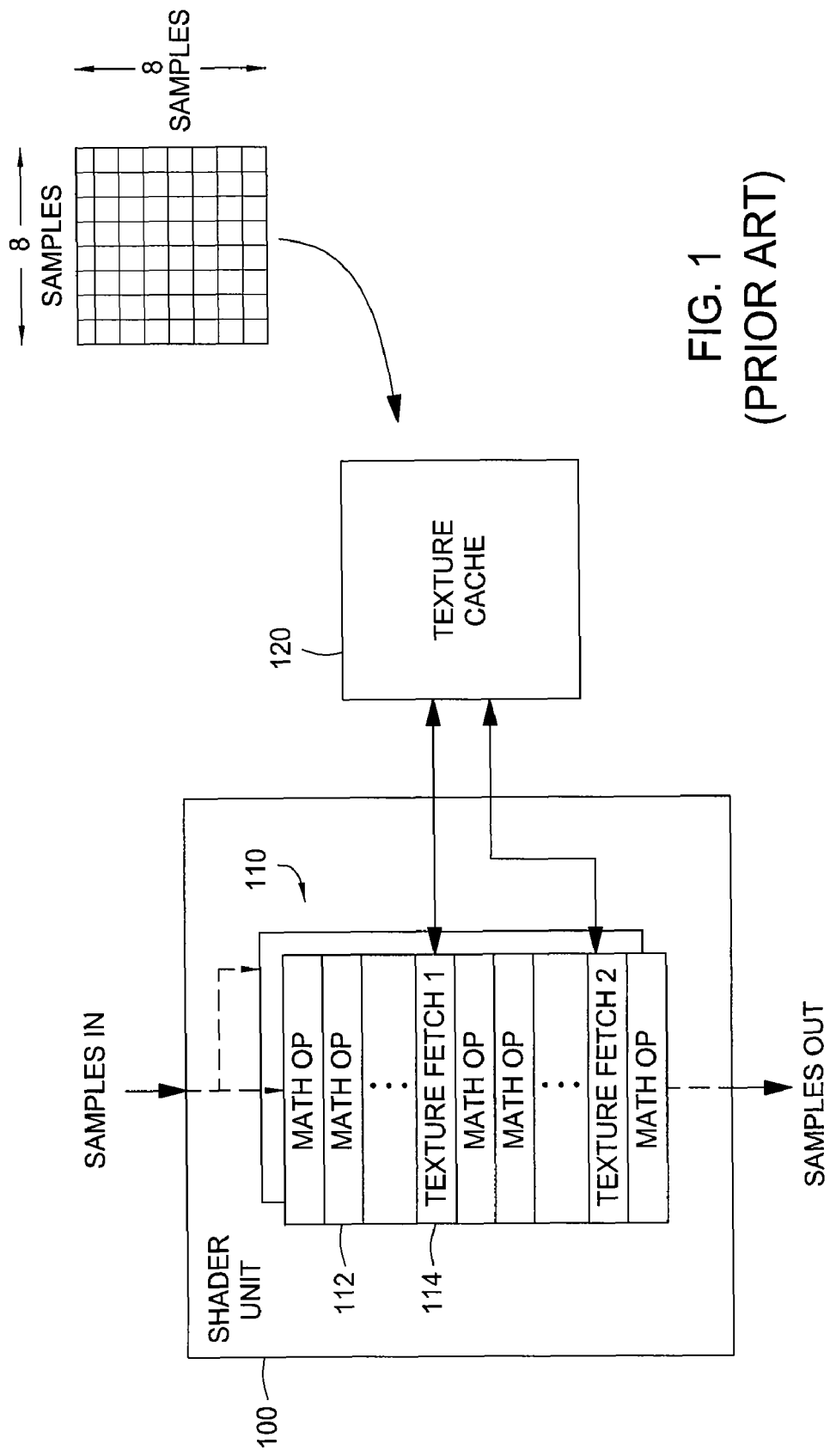
FIG. 1 illustrates a conventional shader unit utilizing a texture cache.
Figure 2:
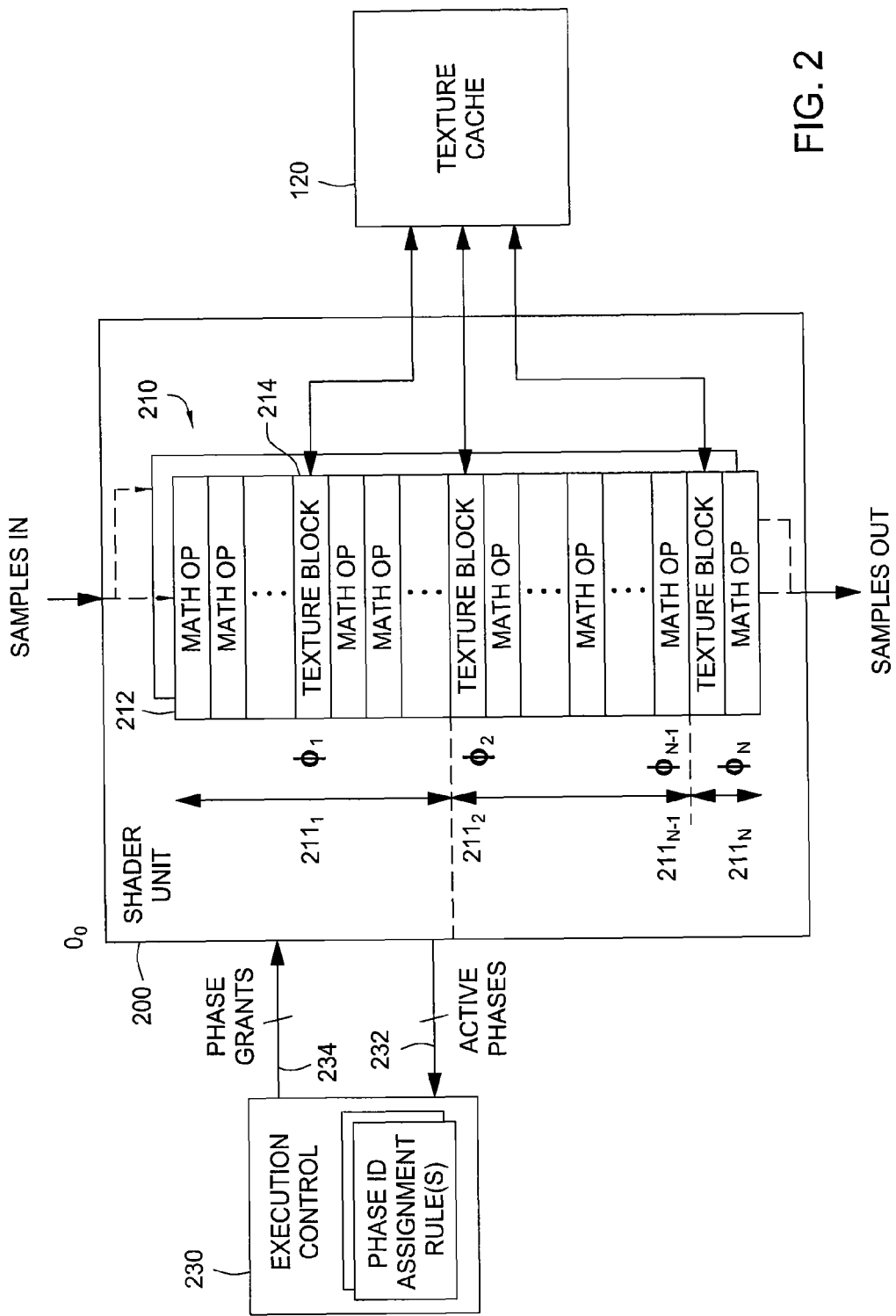
FIG. 2 illustrates a shader unit for executing a subdivided shader program, in accordance with one embodiment of the present invention.

FIG. 2 illustrates a shader unit 200 capable of executing multiple threads 210 of a shader program divided into phases 211 of execution (illustratively, N phases $211_1$-$211_N$ are shown). Typically, each thread 210 will perform the program operations on a different one or more samples. Each phase 211 generally includes a combination of math operations 212 and texture blocks 214. As illustrated, phase boundaries typically occur between math operations 212 of one phase (e.g., $211_1$) and a texture block 214 of a subsequent phase (e.g., $211_2$).

The texture blocks 214 may include multiple non-dependent texture fetch operations. The number of texture fetch operations in each block 214 may, at least in part, be chosen to ensure the number of textures fetched by all operations in a block will fit in the texture cache 120 to prevent the operations from fighting for cache space. For example, if the texture cache 120 is sized to hold three textures, three texture fetch operations may be grouped in each texture block 214. This approach may also lead to efficient utilization of the texture cache 120. For example, as a first texture fetch operation is completing another texture fetch operation may begin. As a result, the latency of the second texture fetch operation may be hidden as the second texture fetch operation is performed "in the shadow" of the first texture fetch operation.

Phase IDs generally serve as a mechanism to prevent texture fetch blocks 214 in one phase from executing before texture fetch blocks 214 in a previous phase have completed. This limited constraint on program execution may prevent texture blocks in multiple phases from fighting for cache space. On the other hand, because math operations 212 typically do not access the cache 120, they may be allowed to execute somewhat randomly, without having to wait for previous phase texture blocks 214 to complete.

Execution control logic 230 (acting as a "phase assigner") may regulate program execution by allowing operations in only certain phases 211 to execute based on the phase IDs of active phases. Active phases may be indicated by a set of active phase control signals 232 provided by the shader unit 200 (e.g., one phase control signal 232 may be asserted for each active phase). The execution control logic 230 may then allow operations in certain phases by asserting one or more phase grant signals 234. For example, the shader unit 200 may contain scheduling logic that prevents instructions in a phase from executing if the corresponding phase grant signal 234 is not asserted.

For some embodiments, the execution control logic 230 may determine exactly when and which phases are granted access based on a set of phase assignment rules 236. In other words, the rules 236 determine which phases are allowed to execute for active threads 210, based on the phases currently executing, as indicated by the active phase signals 232. As an example, one rule may be that a previously granted phase is never disallowed if there are still active requests for it (e.g., threads executing in that phase). In other words, once you have started operations in one phase, execution is allowed to proceed without stopping in the middle. Another rule may be designed to encourage forward progress, preferring to progress in order (e.g., transitioning from phases two, three, four, five) and allow older phases to complete.

As will be described in greater detail below, another rule may be to prevent the input of additional samples into the shader program once the operations of the texture block 214 of the second phase have been reached. For some embodiments, this may be accomplished by "locking" the first phase, in order to prevent additional samples from entering at least the texture block 214 of the first phase. Once all shader program operations have been performed on all samples, the first phase may be "unlocked" to allow additional samples to enter the shader unit. To accomplish this unlocking, one of the rules may be that if there is only one request, and there are no more outstanding requests, the one request should be granted. As a result, once the final phase operations have been executed and the samples are output, the only phase request will be for samples to enter the first phase.

For some embodiments, a GPU may include multiple shader units that share a common texture cache. In such embodiments, to prevent threads executing in separate shader units from fighting for cache space, execution control logic 230 may control the execution of multiple threads of shader programs independently running in each shader unit.

Generating a Subdivided Shader Program

Figure 3:
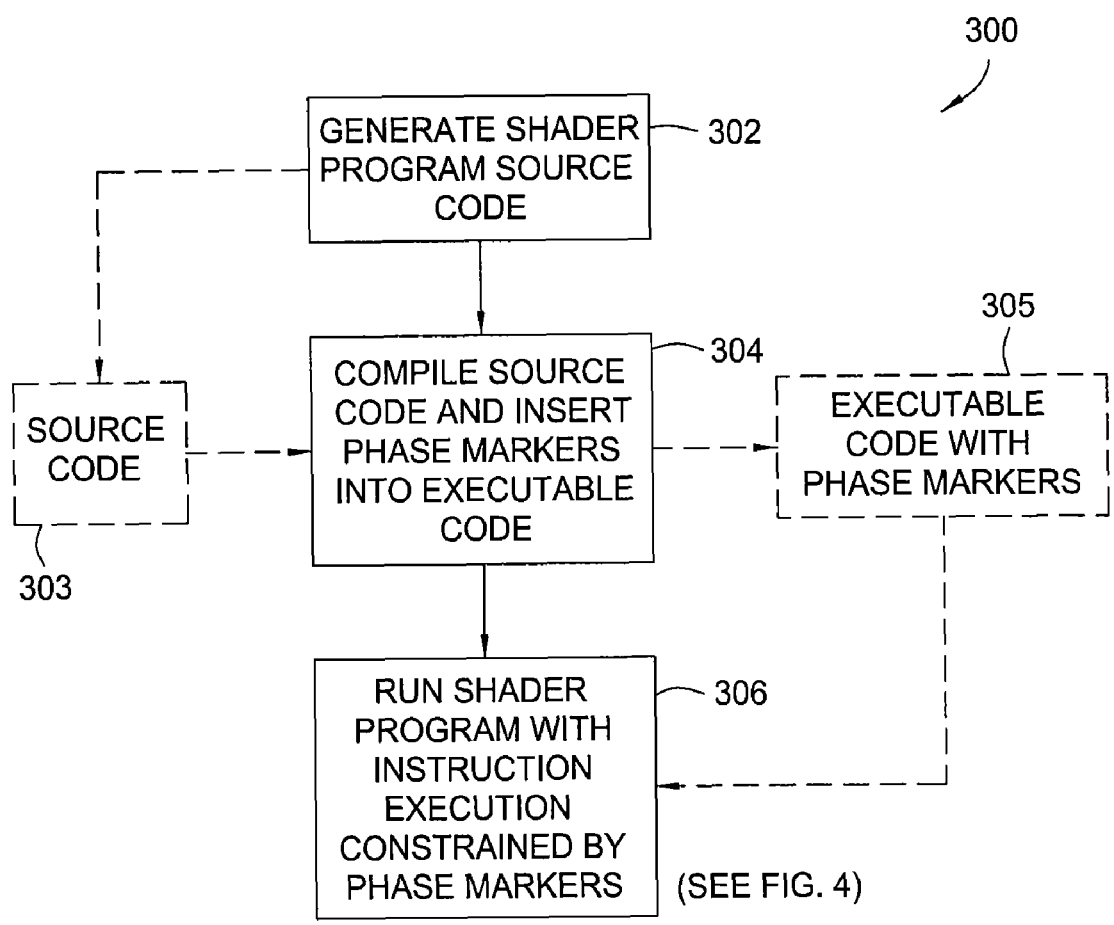
FIG. 3 is a flowchart of exemplary operations for creating a subdivided shader program, in accordance with one embodiment of the present invention.

FIG. 3 is a flow diagram of exemplary operations for creating a shader program with embedded phase IDs. The operations begin, at step 302, by generating source code for the shader program. For some embodiments, the shader program may be written in standard graphics programming language, such as OpenGL or DirectX.

At step 304, the source code is compiled and phase IDs are inserted into the executable code. According to some embodiments, a compiler may be configured to group textures into blocks of non-dependant textures, with the exact number possibly dependent on the number of textures that will fit in the texture cache. The compiler may surround each texture block with several math operations, in an effort to ensure the shader is performing work while waiting for textures. These structures (math-texture block-math) may be repeated throughout the executable code.

Phase IDs may then be inserted, as shown in FIG. 2, to allow hardware (e.g., the execution control logic 230) to know when to pause execution and when to continue. As previously described, while math operations before and after texture blocks may be allowed to execute randomly, texture blocks in subsequent phases are not allowed to execute until texture blocks in previous phases have completed. In some cases, the compiler may not include phase IDs. For example, if a program has only a small number of texture fetch operations or a program has excessive branching such that phase boundaries may be crossed in an unpredictable manner, the program may compile and run in a conventional manner. In any case, at step 306, the shader program is run with instruction execution constrained by the inserted phase IDs.

Those skilled in the art will recognize that the constraint mechanism provided by the phase IDs is generally targeted at improving the efficient use of cache by enforcing some constraints on its access. While described with reference to subdividing a shader program accessing a texture cache, other types of caches, including non-graphics caching systems may also benefit from this same approach. As an example, a large executable program with many threads running may be subdivided in an effort to make more efficient use of an instruction cache (I-cache) by enforcing a degree of locality and preventing different threads from evicting cache lines of instructions for other threads.

Generating a Subdivided Shader Program

Figure 4:
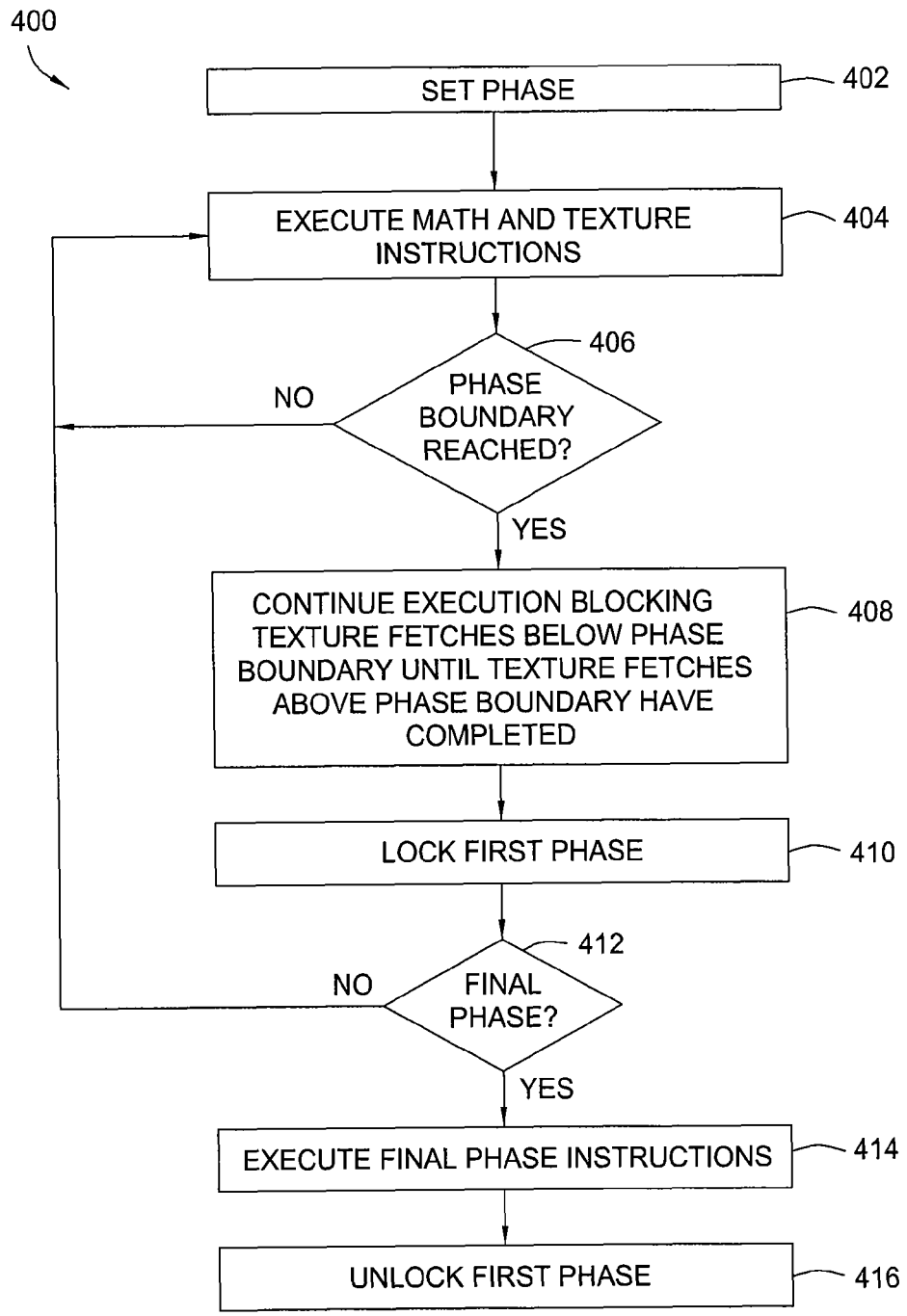
FIG. 4 is a flowchart of exemplary operations for executing a subdivided shader program, in accordance with one embodiment of the present invention.

FIG. 4 is a flow diagram of exemplary operations for executing the shader program with phase IDs, in accordance with one embodiment of the present invention. The operations may be described with reference to FIG. 2 and FIGS. 5A-5D which illustrate a set of samples as they progress down through an exemplary shader program execution. To facilitate discussion, each block of math and texture operations in the illustrated program have been labeled with a letter, with math blocks labeled A, C, E, and G and texture blocks labeled B, D, and E.

The operations begin, at step 402 by executing a set phase instruction. The set phase instruction may set a current phase to 1, for example, asserting one of the active phase signals 232 to notify execution control logic 230 execution in the first phase is requested. In response, the execution control logic 230 may assert a corresponding phase grant signal 234, allowing execution of first phase instructions.

Figure 5B:
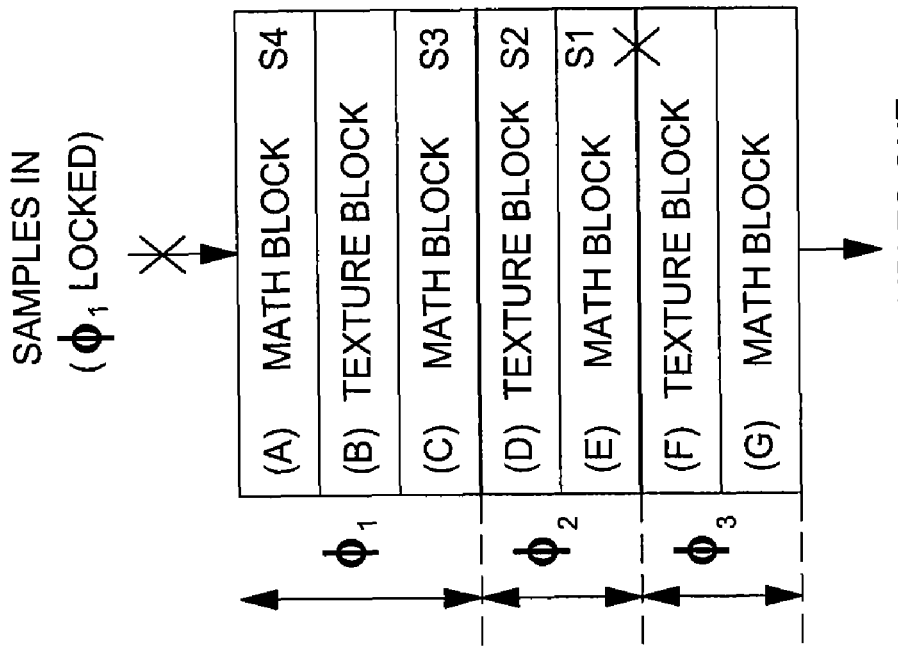
FIGS. 5A-5D illustrate execution flow for an exemplary shader program using phase IDs, in accordance with one embodiment of the present invention.
Figure 5A:
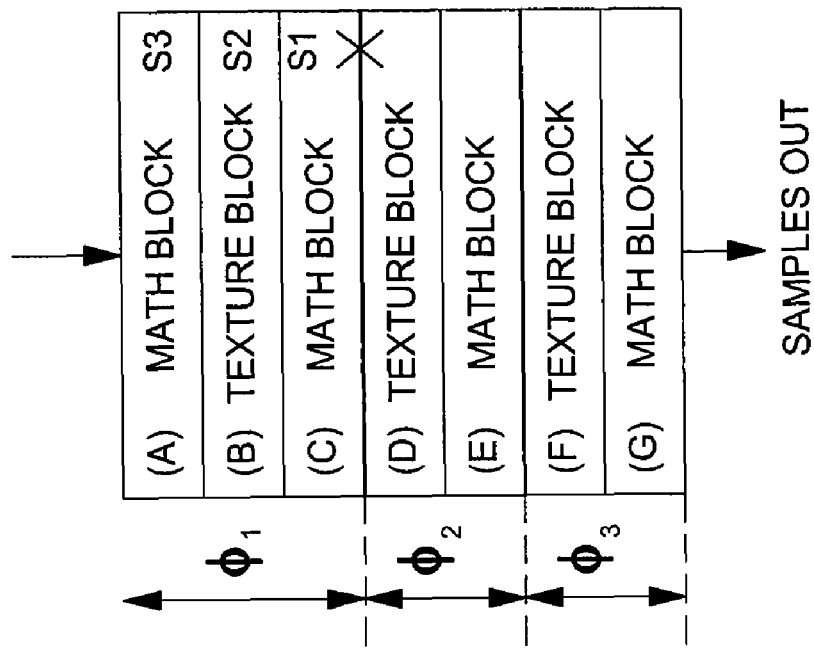

At step 404, execution of both math and texture blocks in the current (first) phase begins. Referring to FIG. 5A, samples S1, S2, and S3 may enter the shader program (e.g., as separate threads). As illustrated, these samples may progress through the first phase, with operations A, B, and C allowed to execute at the same time. Each sample S1, S2, and S3 may actually be processed by separately executing threads of the illustrated shader program.

At step 406, a determination is made as to whether a phase boundary has been reached. If a phase boundary has not been reached, execution of both math and texture operations continues (step 404). In this case, math blocks (A and C) on both sides of a texture block (B) continue to execute.

Once a phase boundary has been reached (e.g., between the math block C and texture block D), execution continues, at step 408, but with texture blocks below the phase boundary prevented from executing until the texture blocks above the phase boundary have completed. For example, the execution control logic 230 may prevent execution below the phase boundary by refusing to assert a corresponding phase grant signal 234, although the corresponding active phase signal 232 is asserted indicating a sample is attempting to enter the next phase (block D).

For some embodiments, once the second texture block D has been reached (as shown FIG. 5B), the first phase may be locked, at step 410, to prevent additional samples from entering the first texture block B behind the current samples. As illustrated, while additional samples (e.g., S4) may be blocked from entering texture block B, math operations in block A may be allowed to execute on these additional samples. The operations 404-408 may be repeated for all remaining phases, with somewhat random execution (step 404) allowed until phase boundaries are encountered and somewhat constrained execution (step 408) allowed thereafter. In other words, while operations of blocks A-B-C and C-D-E are allowed to execute together, operations B-C-D are not allowed to execute together, in an effort to prevent thrashing the texture cache 120.

Figure 5D:
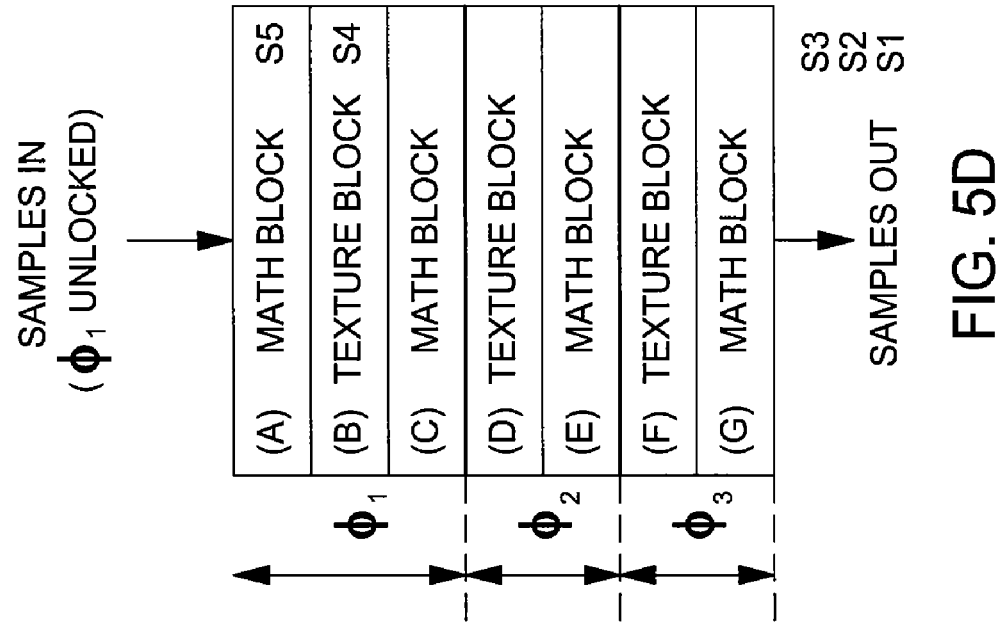
Figure 5C:
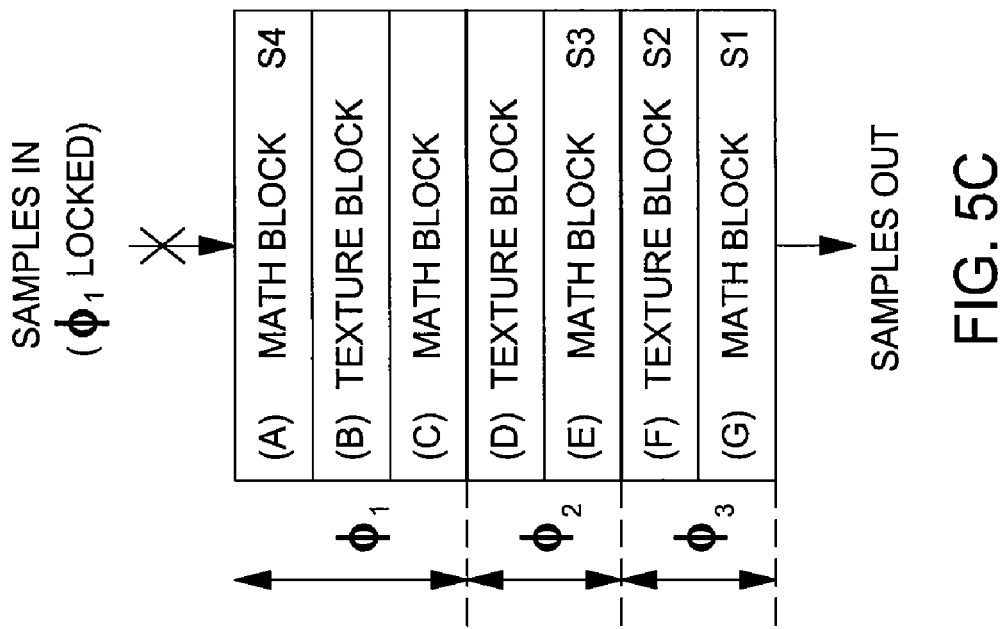

Once the final phase is reached, as determined at step 412, the final phase instructions may be executed, at step 414, after texture blocks in the previous phase have completed (as shown in FIG. 5C). Once all program instruction have been performed on all samples (as shown in FIG. 5D), the first phase may be unlocked, at step 416, allowing additional samples (e.g., S4-S5) to enter the first texture block B. These operations may be repeated on these additional samples and subsequent samples until there are no more samples to process, at which time the shader program may be terminated.

While FIGS. 5A-5D illustrate phases with both math blocks and texture blocks, for some embodiments, each phase may have only math blocks or only texture blocks. As an example, in one implementation, only odd phases may have blocks of texture cache instructions, while even phases may have only blocks of math operations. In such an embodiment, locking phase 1 (an odd phase) would prevent samples from entering the first texture block.

The algorithms and corresponding logic described above for limiting execution of a shader program based on phases is intended as an illustrative, and not limiting, example. Those skilled in the art will recognize that various other schemes may also be implemented to limit execution of a shader program (or other type of program that accesses a cache) based on phases, for example, utilizing other algorithms and corresponding logic.

While the foregoing is directed to embodiments of the present invention, other and further embodiments of the invention may be devised without departing from the basic scope thereof, and the scope thereof is determined by the claims that follow.

The invention claimed is:

1. An integrated circuit, comprising:
an execution unit capable of executing a program subdivided into phases, each phase having at least one or more cache access operations to fetch data from a cache to process two or more samples; and
execution control logic configured to constrain the concurrent execution of cache access operations from different phases in the program while permitting concurrent execution of math operations in different phases of the program,
wherein the execution control logic is configured to detect when a boundary between a current phase and a subsequent phase is reached, and to allow operations in the current phase to continue executing while preventing the execution of cache access operations in the subsequent phase until all cache access operations in the current phase have completed.

2. The integrated circuit of claim 1, wherein the execution control logic is further configured to allow the execution of texture and math operations in the subsequent phase after all cache access operations in the current phase have completed.

3. The integrated circuit of claim 1, wherein the execution control logic is further configured to lock a first phase to prevent cache access operations in the first phase from executing on additional samples after cache access operations in the subsequent phase can be executed.

4. The integrated circuit of claim 3, wherein the execution control logic is further configured to unlock the first phase to allow cache access operations in the first phase to execute on additional samples after the cache access operations in the subsequent phase have completed.

5. The integrated circuit of claim 1, wherein the execution control logic is configured to monitor execution of one or more threads of the program by monitoring a set of active phase signals generated by the execution unit to indicate in which phases of the program one or more threads are executing.

6. The integrated circuit of claim 5, wherein the execution control logic is further configured to allow one or more of the threads to execute instructions in one or more phases of the program by asserting one or more phase grant signals.

7. The integrated circuit of claim 1, wherein:
only one of even and odd phases have math operations.

8. The integrated circuit of claim 7, wherein the cache comprises a texture cache, and the number of texture cache access operations in each texture block is selected to ensure that all of the texture values accessed thereby will fit in the texture cache.

9. A computer system, comprising:
a memory; and
an integrated circuit coupled to the memory and including:
an execution unit capable of executing a program subdivided into phases, each phase having at least one or more cache access operations to fetch data from a cache to process two or more samples; and
execution control logic configured to constrain the concurrent execution of cache access operations from different phases of the program, while permitting concurrent execution of math operations in different phases of the program,
wherein the execution control logic is configured to detect when a boundary between a current phase and a subsequent phase is reached, and to allow operations in the current phase to continue executing while preventing the execution of cache access operations in the subsequent phase until all cache access operations in the current phase have completed.

10. The computer system of claim 9, wherein the execution control logic is further configured to allow the execution of texture and math operations in the subsequent phase after all cache access operations in the current phase have completed.

11. The computer system of claim 9, wherein the execution control logic is further configured to lock a first phase to prevent cache access operations in the first phase from executing on additional samples after cache access operations in the subsequent phase can be executed.

12. The computer system of claim 11, wherein the execution control logic is further configured to unlock the first phase to allow cache access operations in the first phase to execute on additional samples after the cache access operations in the subsequent phase have completed.

13. The computer system of claim 9, wherein the execution control logic is configured to monitor execution of one or more threads of the program by monitoring a set of active phase signals generated by the execution unit to indicate in which phases of the program one or more threads are executing.

14. The computer system of claim 13, wherein the execution control logic is further configured to allow one or more of the threads to execute instructions in one or more phases of the program by asserting one or more phase grant signals.

15. The computer system of claim 9, wherein:
only one of even and odd phases have math operations.

16. The computer system of claim 15, wherein the cache comprises a texture cache, and the number of texture cache access operations in each texture block is selected to ensure that all of the texture values accessed thereby will fit in the texture cache.

* * * * *